United States Patent [19]
Cronson et al.

[11] Patent Number: 4,688,042
[45] Date of Patent: Aug. 18, 1987

[54] SHORT PULSE RECEIVER WITH ANTI-JAM CAPABILITY

[75] Inventors: Harry M. Cronson, Lexington; Richard M. Mara, Tewksbury, both of Mass.

[73] Assignee: Sperry Corporation, New York, N.Y.

[21] Appl. No.: 336,643

[22] Filed: Oct. 8, 1981

[51] Int. Cl.⁴ .............................................. G01S 7/36
[52] U.S. Cl. .................................................... 342/19
[58] Field of Search ............ 343/5 CF, 18 E; 342/16, 342/17, 19, 21

[56] References Cited
U.S. PATENT DOCUMENTS 3,011,053  11/1961  Sev ..................................... 343/18 E
4,135,159  1/1979   Kubanoff ....................... 343/18 E X
4,213,128  7/1980   Longinotti ..................... 343/18 E X Primary Examiner—T. H. Tubbesing
Attorney, Agent, or Firm—Howard P. Terry; Seymour Levine

[57] ABSTRACT

A short pulse radar receiver having a detector with a threshold automatically adjustable with the level of noise and interfering signals. Interfering signals at signal levels which exceed the maximum for which a threshold may be achieved to prevent a false alarm are attenuated prior to coupling to the variable threshold detector by an attenuator variable automatically in accordance with the received signal level.

10 Claims, 6 Drawing Figures

SHORT PULSE RECEIVER WITH ANTI-JAM CAPABILITY

BACKGROUND OF THE INVENTION

1. Field of the Invention

The present invention relates to short pulse radar systems and more particularly to the minimization of susceptibility of such systems to CW narrow band jamming.

2. Description of the Prior Art

Radar systems using short pulses in the order of a nanosecond have a capability of providing range resolution and accuracy to fractions of a foot. These devices, however, though insensitive to multiple target deception and impulse type jammers, because of receiver range gates that are only a few nanoseconds wide, are vulnerable to electronic countermeasures (ECM) such as CW narrow band or spot jammers operating in the same spectral band as the baseband pulse. Incident signals from CW jammers in this range present a multiplicity of half cycles within the range gate that appear as short pulses to the system's receiver, thus providing an opportunity for the jamming signal to exceed the system threshold with each cycle. Providing a narrow range gate to reduce the probability of false alarms with each cycle of CW signal concomitantly requires a moving range gate to cover the desired over-all range, thus adding an undesired complexity. To utilize the inherent range resolution and accuracy of short pulse radar systems, a means for minimizing its susceptibility to CW narrow band jamming is required.

A prior art solution to this problem is disclosed in U.S. Pat. Application Serial No. 845,984 filed by Gerald F. Ross on Oct. 27, 1977 and assigned to the assignee of the present invention. Ross discloses a passive filter comprising a shorted stub of length l and characteristic impedance $R_0/2$ branching from a line of characteristic impedance $R_0$. This configuration exhibits a large insertion loss to a CW signal with a wavelength $\lambda_0$ when $l = k\lambda_0/2$, k being any integer, but passes a pulse length of $\tau$ with an insertion loss of 6 dB as long as $2l/v > \tau$, where v is the signal velocity along the line. Although this shorted stub filter provides the desired large differential insertion loss between a CW signal and a short pulse, its bandwidth is only of the order of 50 MHz. Multiple stage filter designs do not solve the problem since the differential insertion loss decreases as the bandwidth increases. Consequently, although a shorted stub may be useful in a circuit, a passive filter alone does not provide the desired immunity to spot jamming over a large dynamic range of jamming signal frequencies.

Additional improvement in anti-jam capability against narrow band CW signals may be realized by utilizing the jamming signal as a local oscillator to mix with the short pulse signal as disclosed in U.S. Pat. Application Serial No. 336,642 for "Baseband Detector with Anti-Jam Capability", filed by Cronson et al on the filing date of, and assigned to the assignee of, the instant application. Though significant anti-jam improvement is exhibited with the use of the jamming signal as a local oscillator, when two jamming signals are present within the band, however, mixing thereof may produce a signal at a difference frequency within the pass band of the system that may be of sufficient amplitude to jam the receiver. This difference frequency jamming is primarily caused by the tunnel diode bias circuitry in the receiver, which is generally of the type disclosed in U.S. Pat. No. 3,983,422, issued to Nicolson et al in Apr. 1975 and assigned to the assignee of the present invention. The adjustability of the bias circuitry in the receiver disclosed by Nicolson et al is insufficient to reduce the tunnel diode sensitivity to a level at which it does not fire in the presence of the relatively high amplitude difference frequency signal created by the mixing of the two jamming signals.

SUMMARY OF THE INVENTION

A preferred embodiment of a short pulse receiver in accordance with the present invention provides an automatic adjustment of bias current through a tunnel diode threshold detector which may continuously vary over a range substantially between 0 and 5 milliamps. This current range adjustment, in conjunction with an input impedance of the order of 120 ohms, establishes a level of substantially 600 mV that must be achieved by an interfering signal to jam the receiver. The bias current variability is not limited to the range between 0 and 5 ma. It may be extended to include negative bias currents to increase jamming signal level required to disable the receiver.

In another preferred embodiment the short pulse detection capability in a jamming environment of two spot jammers at relatively high power levels is improved by providing an automatically variable attenuator between the receiving antenna and the tunnel diode detector. Two diode circuits, a signal path and a control path, are arranged in parallel with both coupled to receive the short pulse and interfering signals at the input ends while the paths are coupled through a FET at the circuit end opposite the signal input end. In operation, the signal path acts as a voltage variable resistor which is automatically controlled by the output level of a video amplifier in the control path. When the signal levels coupled to the control and signal paths are low, the FET is in the ON state, exhibiting a resistance of substantially 100 ohms. In this condition, the bias current through the diode in the signal path is conducting, and a resistance of less than 1 ohm is contributed to the circuit. Increases in the received signal level cause the current flowing in the control diode to increase which in turn lowers the voltage applied to the gate of the FET, resulting in an increase in the drain-source resistance. This increased resistance reduces the bias current flowing through the signal path diode causing the signal path resistance to increase thereby, increasing the insertion loss through the signal path.

In still another preferred embodiment, a signal converter comprising a Schottky diode mixer coupled to a local oscillator (L.O.) and d.c. bias circuit is coupled between the receiving antenna terminals and the variable attenuator. The L.O. and d.c. bias levels of the converter are adjusted in accordance with the received jamming signal level to enhance detection probability in the jamming environment.

DESCRIPTION OF THE PREFERRED EMBODIMENTS

Figure 1:
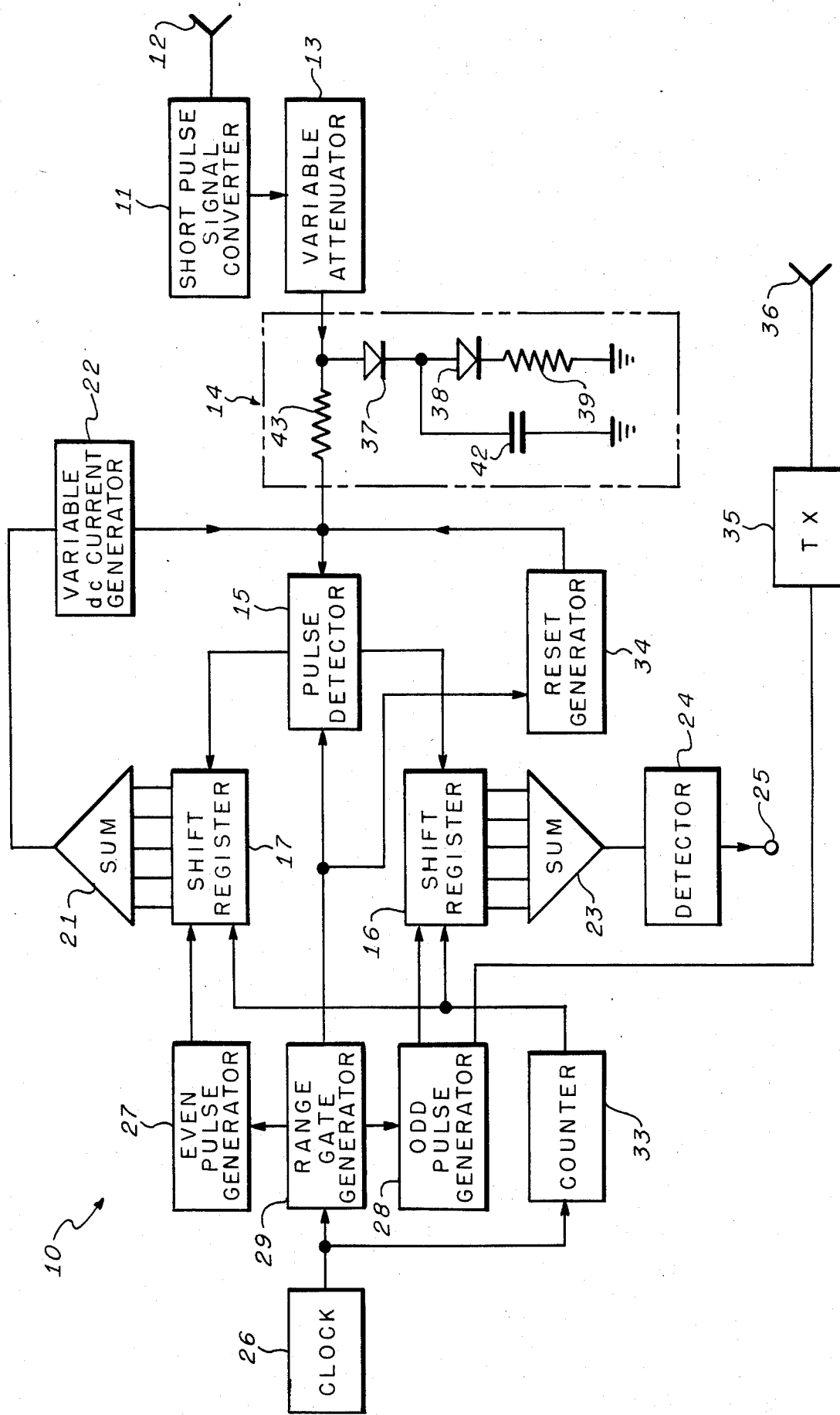
FIG. 1 is a block diagram of a short pulse signal receiver that incorporates a variable d.c. bias current generator and an automatically variable attenuator.

Referring to FIG. 1, a short pulse receiver with anti-jam capability 10 may include a short pulse signal converter 11 coupled between a receiving antenna 12 and the input terminal of a variable attenuator 13. A threshold detector 14 is coupled between the output terminal of the variable attenuator 13 and the input terminal of a pulse detector 15, the output terminals of which are coupled to the serial input terminals of serial input/parallel output shift registers 16 and 17. A summing circuit 21 and variable d.c. current generator 22 are serially coupled between the parallel output terminals of the shift register 17 and the threshold detector 14, while a summing circuit 23 and an object detector 24 are serially coupled between the parallel output terminals of shift register 16 and the receiver output terminal 25. A clock 26 is coupled to even pulse generator 27, odd pulse generator 28, and range gate generator 29 which are respectively coupled to the clock terminal of shift register 17, the clock terminal of shift register 16, and the enable terminal of pulse detector 15. Clock 26 is also coupled to a counter 33, the output terminal of which is coupled to the reset terminals of shift registers 16 and 17, while a reset generator 34 is coupled between the range gate generator 29 and the threshold detector 14.

A first pulse from clock 26, and every other pulse thereafter, i.e., 3, 5, 7, 9 . . ., causes the odd pulse generator 28 to trigger a transmitter 35, wherefrom a short pulse of electromagnetic energy is coupled to an antenna 36 and radiated therefrom. With every pulse from clock 26, range gate generator 29 provides a range gate to pulse detector 15 and to reset generator 34 which responds to the leading edge of the range gate to couple a reset pulse to the threshold detector 14. Threshold detector 14 may comprise a tunnel diode 37, the cathode of which is coupled to the output terminal of the variable attenuator 13 while the anode is coupled to ground via the series combination of a diode 38, which may be of the Schottky type, and a resistor 39 in parallel with a capacitor 42. A resistor 43 may be coupled between the cathode of the tunnel diode 37 and the input terminal of the pulse detector 15. At the leading edge of each range gate the reset generator 34 provides a pulse via resistor 43 to the tunnel diode 37 to reset it to or maintain it in its low level state. Target returns of the transmitted short pulse received by the antenna 12 are coupled through the short pulse signal converter 11, which may be of the type described in U.S. Pat. Application Serial No. 336,642 "Baseband Detector with Anti-Jam Capability", filed by Cronson et al and assigned to the Sperry Corporation, and variable attenuator 13, yet to be described, to the cathode of the tunnel diode 37. This pulse causes the tunnel diode to change to its high level state thus coupling a pulse of sufficient magnitude for detection to pulse detector 15. The pulse output from pulse detector 15 is coupled to the serial input terminal of shift register 16 and entered into the stage thereof made available by the signals from the odd pulse generator 28. With each transmitted odd pulse, the register is shifted, in response to pulses from the range generator 29, and signals representative of the tunnel diode state are entered into the available stage. Each register of shift register 16, is coupled via the parallel output terminals to the sum circuit 23, wherefrom a signal corresponding to the number of low-to-high level state transitions of the tunnel diode is coupled to the object detector 24 which couples a signal, representative of a target detection, to the receiver output terminal 25 when the signal level coupled thereto from the sum circuit 23 exceeds a predetermined threshold.

With each even pulse, range gate 29 causes even pulse generator 27 to clock shift register 17 and enable the available stage therein for the duration of the range gate. The transmitter 35 is not triggered by the occurrence of the even pulses and signals received at the antenna 12 are due to interfering sources or noise. As previously described, reset generator 34 sets the tunnel diode 37 to its low level state at the leading edge of each range gate coupled from range gate generator 29. Low-to-high transition of the tunnel diode are now caused by noise or the interfering signals. Pulses indicative of such transitions are coupled to the pulse detector 15 and output pulses therefrom are coupled to the serial input terminal of shift registers 17 and entered into the stage made available by the signals from the even pulse generator 27. With each successive even pulse, another stage is enabled and signals representative of the stage of the tunnel diode 37 during the range gate interval are entered in the available stage. These signals are coupled to the sum network 21 via the parallel output terminals of the shift register. A signal representative of the number of low-to-high level state transitions of the tunnel diode 37 is provided from the sum network 21 to the variable d.c. current generator 22. This representative signal causes the variable d.c. generator 22 to couple a d.c. bias current, via resistor 43, to the tunnel diode 37, establishing a d.c. voltage bias thereto that is a function of the number of low-to-high tunnel transitions caused by the noise or interfering signals, the bias voltage increasing with each transition. Ripple on the d.c. voltage level caused by noise or an interfering signal is rectified by the diode 38 and smoothed by the capacitor 42 to provide a minimized ripple on the d.c. voltage bias applied to the tunnel diode 37 by current flowing through the resistor 39. Current coupled to the threshold detector 14 is therefore a function of the noise and interfering signal levels applied to the tunnel diode 37. The variable current, by virtue of its flow through resistor 39, establishes a variable voltage threshold for the tunnel diode 37. A voltage threshold value established after each even pulse is the effective threshold for signals received after an odd transmission from transmitter 35. The system continues to alternately sample the noise and interfering signal levels and operating as a short pulse radar system until 2N clock signals from clock 26 cause counter 33 to couple reset signals to shift registers 16 and 17. Since detector 24 has a threshold level equal to the sum circuit 23 output level corresponding to M recorded detections by the tunnel diode 37, the receiver operates as a constant false alarm receiver with a M of N detection criteria.

Figure 2A:
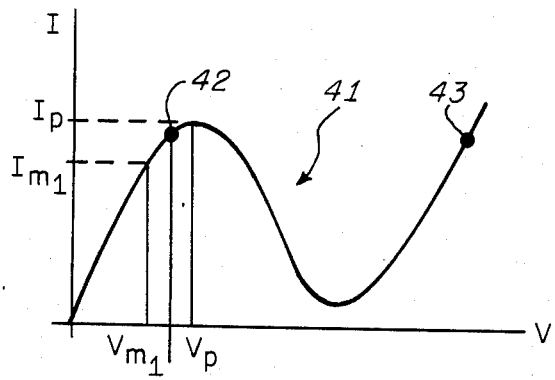
FIGS. 2a and 2b are plots of tunnel diode characteristics useful in describing the operational improvement realized with the utilization of the variable current bias circuit.
Figure 2B:
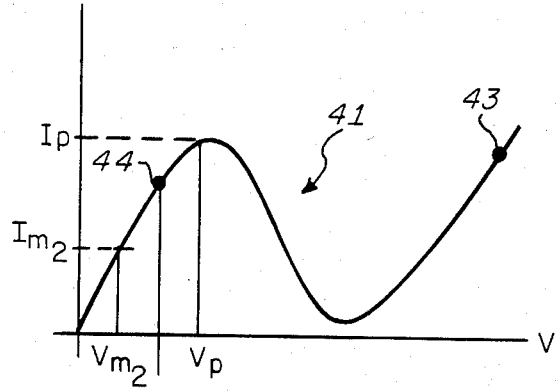

Refer now to FIGS. 2a and 2b wherein a plot 41 of the current versus voltage characteristics for a tunnel diode is shown. A tunnel diode with a peak current of $I_p$, which may be in the order of 5 ma, will change states when the signal applied thereto exceeds the voltage corresponding to this current value, jumping from the bias point 42 to a new operating point 43. When the signal coupled to the tunnel diode consists of signal plus noise, the feedback circuits, described above, act to adjust the bias point 42 so that the diodes will trigger on noise a small percentage of the time to maintain a constant false alarm ratio. If a minimum bias current $I_{m1}$ is in the order of 4 ma, the bias voltage applied to the tunnel diode is in the range between $V_p$ and $V_{m1}$ allowing noise and interfering signals of relatively moderate levels to exceed the threshold $V_p$ and trigger the tunnel diode to change states.

When the bias current range is extended as shown in FIG. 2b to be between $I_p$ and $I_{m2}$, a bias point 44 may be established from which a signal of greater amplitude is required to fire the tunnel diode to the higher level operating point 43. Though $I_{m2}$ is indicated in FIG. 2b, at a level above 0 amps., it should be recognized by those skilled in the art that this minimum bias level may be extended to negative values to prevent the tunnel diode from firing when interfering and noise signals of relatively large magnitudes are coupled thereto.

Since the signal voltage that must be exceeded to fire the tunnel diode is established by the internal resistance of the tunnel diode and the value of the resistor 39 in FIG. 1, an increase in this resistance value increases the triggering voltage, concomitantly increasing the signal level required for a tunnel diode change of state. As for example, a resistance value of 100 ohms for resistor 39, an internal resistance of 20 ohms for tunnel diode 37 and a peak current $I_p$ or 5 ma requires a signal plus bias level that exceeds 600 millivolts to alter the state of the tunnel diode 37.

Figure 3:
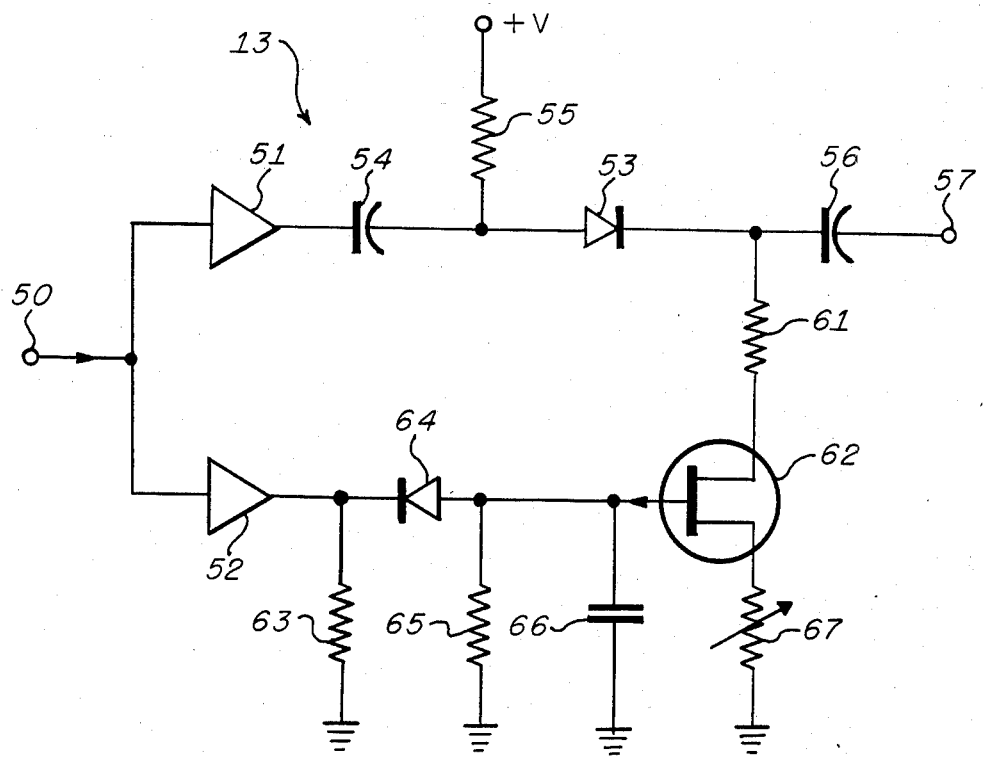
FIG. 3 is a schematic diagram of an automatically variable attenuator that may be used in the circuit of FIG. 1.

Noise and interfering signals for which the signal plus bias level exceeds the peak voltage of the tunnel diode may be reduced by the automatically adjustable variable attenuator 13 for which a schematic diagram is shown in FIG. 3. A signal from the short pulse signal converter 11 is coupled to the input terminal 50 wherefrom it is coupled to amplifiers 51 and 52 to respectively traverse the signal and attenuator control paths. The output signal from amplifier 51 is coupled to the anode of diode 53, which may be the type designated HP 5082-3080, via a capacitor 54. The anode of diode 53 is also coupled to a voltage source, not shown, via a resistor 55, while the cathode thereof is coupled to the threshold detector 14 via capacitor 56 and the output terminal 57. When a low level signal is applied to the input terminal 50, the voltage source coupled via resistor 55, diode 53 and resistor 61 to FET 62, which may be of the type 2N5460, causes the FET 62 to be in the ON state. When, for example, a voltage source of +5 volts is applied, resistor 55 is 1,000 ohms, resistor 61 is 470 ohms, and the source of FET 62 is coupled to the ground via a variable resistor 67 set at 120 ohms, 3 ma flow through diode 53 which exhibits a resistance less than 1 ohm while FET 62 exhibits a resistance of approximately 100 ohms. The output terminal of amplifier 52 is coupled to ground via resistor 63 and to the cathode of a diode 64, the anode of which is coupled to the gate of FET 62 and to ground via a resistor 65 in parallel with a capacitor 66. An increase in the signal level coupled to the input terminal 50 is amplified in the amplifier 52 and detected by the diode 64 which may be of the type HP 5082-2787, the resulting current causing the gate voltage on the FET to decrease thus increasing the drain-source resistance. This increased resistance reduces the bias current flowing through the diode 53 thereby increasing the resistance thereof and increasing the attenuation of the signals coupled from the diode 53 to the output terminal 57.

Figure 4:
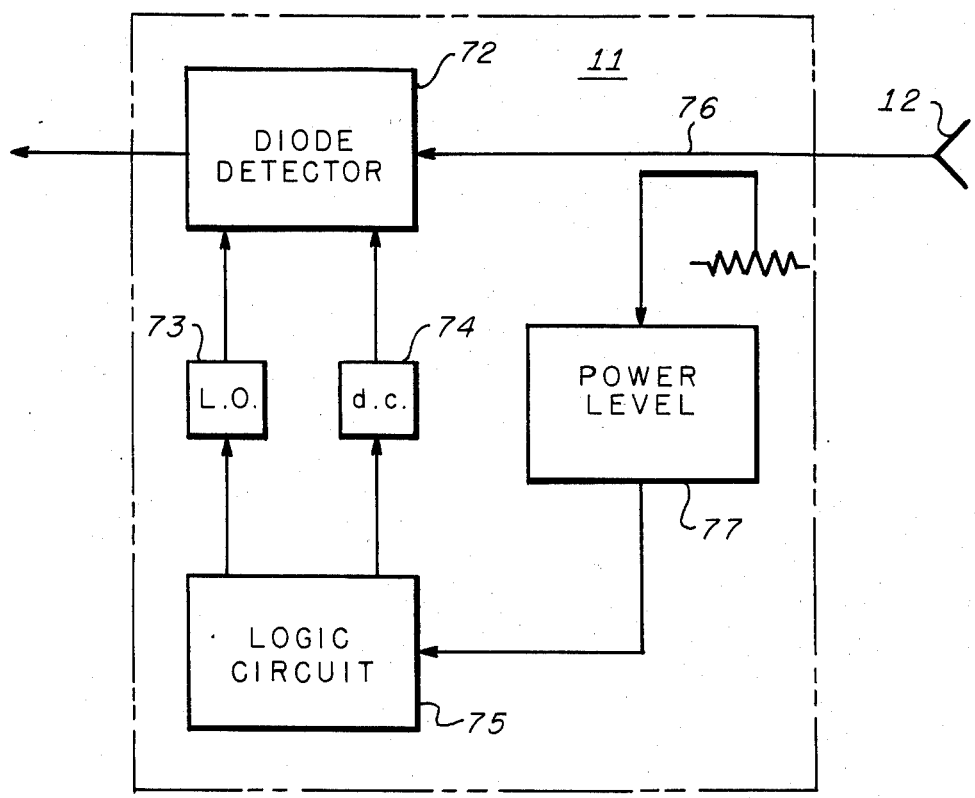
FIG. 4 is a block diagram of a preferred circuit for the short pulse signal converter of FIG. 1.

Additional improvement in receiver performance in a jamming environment may be realized with the converter 11 circuit shown in FIG. 4. The output terminals of the receiving antenna 12 may be coupled to a diode detector 72, in which the diode may be a Schottky diode such as HP 5082-2787. A local oscillator 73 and d.c. bias generator 74, controlled by signals from a logic circuit 75, may be coupled to the mixer to provide a L.O. signal and d.c. bias thereto. Short pulse returns from targets of interest and jamming signals, when present, are coupled via antenna 12 to the diode detector 72 and, via a directional coupler 76 to a power level detector 77. A signal representative of the jammer plus signal power level is coupled from the power level detector 77 to the logic circuit 75, wherefrom control signals are coupled to the local oscillator 73 and d.c. bias generator 74 to establish the local oscillator level coupled to the mixer 72 and the d.c. bias level applied to the diode therein.

Figure 5:
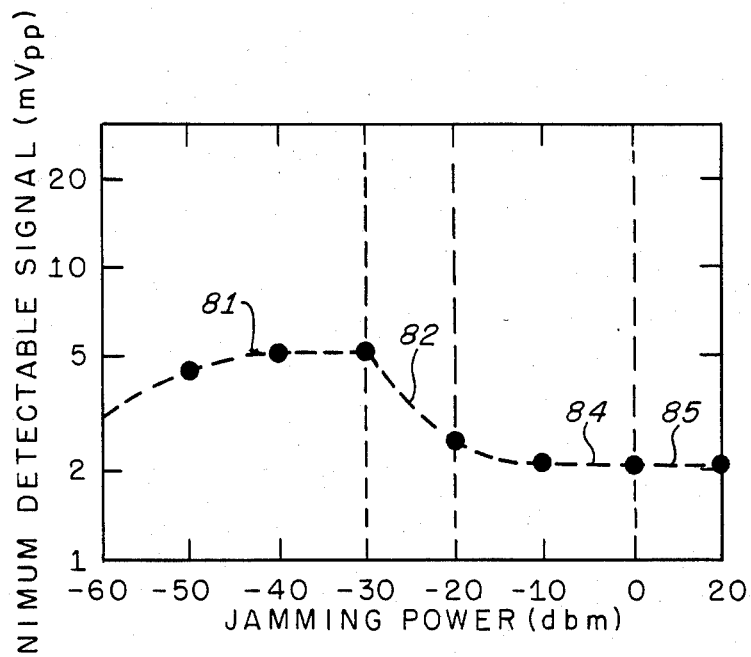
FIG. 5 is a plot of minimum detectable signals in a jamming environment for the circuit of FIG. 4.

FIG. 5 is representative of the receiver sensitivity achieved in a jamming environment. When the received jamming power is below −30 dBm, the signal coupled from the power level detector 77 causes the logic circuit 75 to provide a control signal to the local oscillator 73 and d.c. bias generator 74 which establishes a L.O. power level of −8 dBm and a d.c. bias current of 200 μA. Under these operating conditions, the receiver sensitivity is as shown by the curve segment 81. When the jamming power exceeds −30 dBm, the local oscillator 73 is shut off and the jamming power is utilized by the diode as a local oscillator by the control signals from the logic circuit 75. A d.c. bias current of 200 μA continues until the jamming level reaches −20 dBm, providing a receiver sensitivity for jamming levels between −30 dBm and −20 dBm represented by the curve segment 82. Jamming levels between −20 dBm and 0 dBm cause the d.c. bias current to be reduced to 100 μA creating the receiver sensitivity of curve segment 84. To prevent the diode from saturating when the jamming power exceeds 0 dBm, the logic circuit causes the d.c. bias generator 74 to increase the bias current 200 μA, resulting in the receiver sensitivity curve 85. A more complete explanation of the utilization by a diode of jamming power as a local oscillator and of d.c. bias current to enhance detection in a jamming environment may be found in the aforementioned patent application filed by Cronson et al.

While the invention has been described in its preferred embodiments, it is to be understood that the words which have been used are words of description rather than limitation and that changes may be made within the purview of the appended claims without departing from the true scope and spirit of the invention in its broader aspects.

We claim:
1. A short pulse radar receiver comprising:
 means for receiving short pulse radar and interfering signals;
 means coupled to said receiving means for generating currents variable within a preselected range of current values in response to levels of noise and said interfering signals; and
 detecting means coupled to said receiving means and to said current generating means for establishing signal thresholds commensurate with said generated current and for providing signals at output means thereof whenever signals coupled from said receiving means exceed said signal thresholds.

2. A short pulse radar receiver in accordance with claim 1 wherein said detecting means includes a tunnel diode coupled to receive said variable current, said interfering signals, and said short pulse radar signals.

3. A short pulse radar receiver in accordance with claim 2 further including a resistor and a capacitor in parallel relationship coupled between said tunnel diode and ground.

4. A short pulse radar receiver in accordance with claim 3 wherein a unidirectional current conductor device is coupled in series relationship with said resistor.

5. A short pulse radar receiver in accordance with claim 1, 2, 3 or 4 wherein said current generating means is constructed to provide a preselected range of current values between 0 and 5 ma.

6. A short pulse radar receiver in accordance with claim 1, 2, 3 or 4 wherein said current generating means includes means coupled between said receiving means and said detecting means for providing signal attenuation variable in accordance with said signal levels at said receiving means.

7. A short pulse radar receiver in accordance with claim 6 wherein said variable attenuator means comprises:
    means coupled between said receiving means and said detecting means for providing a resistance variable in accordance with control current flowing therethrough;
    means coupled to said variable resistance means for supplying said control current; and
    means coupled to said receiving means and control current supply means for varying said control current in accordance with signal levels at said receiving means.

8. A short pulse radar receiver in accordance with claim 7 wherein said control current supply means comprises:
    gate means coupled to said variable resistor means for adjusting current flow through said variable resistance means, thereby controlling resistance values of said variable resistance means; and
    means coupled between said gate means and said receiving means for coupling signals to said gate means representative of signal levels at said receiving means whereby current is adjusted through said variable resistance means in a manner to increase signal attenuation between said receiving means and said detecting means as signal levels of said receiving means increases.

9. A short pulse radar receiver in accordance with claim 7 wherein:
    said variable resistance means includes a first diode having an anode coupled to said receiving means and a cathode coupled to said detecting means;
    said control current supply means includes means coupled to said anode of said first diode for receiving d.c. signals, and means coupled to said cathode of said first diode for controlling d.c. current flow through said first diode in response to signals coupled to gate means of said d.c. current control means; and
    said control current varying means includes a second diode having a cathode coupled to said receiving means and an anode coupled to said gate means of said d.c. current control means, such that signals coupled from said receiving means to said cathode of said second diode cause said d.c. current flowing through said first diode to vary in accordance with signal levels at said receiving means thereby altering resistance values of said first diode.

10. A short pulse radar receiver in accordance with claim 1, 2, 3 or 4 wherein said receiving means comprises:
    means for detecting level of said short pulse signal plus said interfering signal;
    logic means coupled to said level detecting means for generating first and second control signals;
    means coupled to receive said first control signal from said logic means for generating a local oscillator signal in response thereto;
    means coupled to receive said second control signal from said logic means for generating a d.c. current in response thereto; and
    means coupled to said local oscillator means, to said d.c. current generator means, to receive said short pulse radar and interfering signals and to said detecting means for providing a short pulse to said detecting means having a sufficient signal-to-noise ratio for detection thereby.

* * * * *